United States Patent Office 2,709,688
Patented May 31, 1955

2,709,688

TREATMENT OF ALUMINUM FLUORIDE OR ZIRCONIUM FLUORIDE CATALYSTS WITH CHLORINE TRIFLUORIDE

Selwyn Bandes, Bronx, and Charles B. Miller, Lynbrook, N. Y., assignors to Allied Chemical & Dye Corporation, New York, N. Y., a corporation of New York No Drawing. Application October 6, 1953,
Serial No. 384,522

6 Claims. (Cl. 252—411)

This invention relates to treatment of catalytic materials particularly active in promoting reactions in which halogen compounds are reactants and/or products. More specifically, the invention is directed to a novel and improved method for regeneration and activation of aluminum fluoride and zirconium fluoride catalysts which are highly effective in altering the halogen content of organic carbon compounds containing halogen.

Compositions such as antimony fluoride and mixtures thereof with antimony chloride have been proposed for use in promoting e. g. fluorination of aliphatic halides with HF to bring about substitution of halogen other than fluorine, by fluorine. Operations with these catalysts are characterized by disadvantages arising by reason of corrosiveness, liquid form, and high volatility of antimony halides, the latter factor leading to operational and product contamination difficulties. Aluminum chloride and bromide have been proposed for catalyzing disproportionation (redistribution of halogen among the molecules of compounds containing more than one variety of halogen atom), but yields have not been as high as desired, and again, the less expensive aluminum chloride is limited with respect to operation at high temperature by the shortcoming of high volatility. For conducting hydrohalogenation (addition of hydrogen halide to a double bond to produce saturation) or dehydrohalogenation (removal of hydrogen halide from adjoining carbon atoms to produce an unsaturated linkage), catalysts such as chromium trifluoride, gaseous free oxygen and activated carbon have been proposed, but such processes encounter the disadvantage of undesirably low conversion or, particularly in the case of the gaseous oxygen catalyst, lack of ease of manipulation and control.

Certain aluminum and zirconium fluorides have been found to be effective catalysts in promoting reactions involving alteration of the halogen (e. g. fluorine) content of organic carbon halogen-containing compounds, such as fluorination of halogenated organic compounds with HF, disproportionation, hydrohalogenation and dehydrohalogenation. The activity of such catalysts, however, declines gradually in use until the catalysts cease to exhibit economical activity at the maximum temperature employable for their use in a particular reaction. Further, different batches of the catalysts in fresh form often exhibit different initial activity, and, in some instances, have been subjected to temperature up to 100° C. higher than operating temperature in order to insure development of uniformity and peak activity.

An object of the present invention includes a method for beneficiating aluminum and zirconium fluoride catalysts to produce catalysts having uniform and high activity in promoting formation of fluorine-containing compounds. Another object of the present invention is a method for regenerating spent aluminum or zirconium fluoride catalysts. A further object of the present invention is a method for activating fresh aluminum or zirconium fluoride catalysts to bring such catalysts to substantially identical behavior as regards catalytic activity. Other objects and advantages will appear as the description of the invention proceeds.

The fresh aluminum or zirconium fluoride catalysts to which the present invention is applicable may be prepared in any suitable manner. A particularly suitable method involves treating anhydrous aluminum or zirconium halide (other than fluoride) with gaseous inorganic fluorinating agent reactive therewith such as hydrogen fluoride under conditions to bring about reaction between the starting materials. Temperature is suitably controlled within the approximate range of 20° to 250° C. to avoid appreciable volatilization of solid reactant. Contact between gaseous fluorinating agent and the metal halide is maintained for time and in the presence of sufficient agent to permit substantial, preferably complete conversion of the metal halide to the corresponding fluoride.

The catalysts produced according to the aforedescribed method, although composed of lumps or other discrete particles of substantial size, when examined even by the highest powered optical microscopes, appear to be of non-crystalline or "amorphous" structure. When these "amorphous" fluorides are examined using X-ray diffraction technique, extremely small sub-microscopic crystals, "crystallites," may be detected. The "amorphous" aluminum fluoride catalysts have "crystallite" size not substantially greater than about 500 Angstrom units radius, preferably not substantially greater than about 200 Å. radius. The "amorphous" zirconium fluoride catalysts have "crystallite" size not substantially greater than about 400 Å. radius and preferably 150 Å. or less. These non-crystalline or "amorphous" catalysts have been found to be unusually active and versatile in altering halogen content of halogen-containing compounds.

The aluminum and zirconium fluoride catalysts produced by other methods often consist of lumps or smaller discrete particles, which lumps or particles in turn are composed of crystals of relatively large size, i. e. not less than 1000 and usually several thousand Angstrom units and above. The latter macrocrystalline fluoride catalysts are not as effective in promoting reactions, particularly at mild conditions, e. g. fluorinating with HF at 100–300° C., as are the "amorphous" fluoride catalysts. In use, the "amorphous" fluoride catalysts sometimes have developed crystallinity which lowers the activity of the catalysts.

According to the present invention, aluminum or zirconium catalysts are beneficiated by contacting the catalyst with chlorine trifluoride. Operation is advantageously carried out by contacting the catalyst with chlorine trifluoride at temperature of about 100° to 400° C., and then sweeping the treated catalyst with an inert gas.

The process of the present invention has been found to unexpectedly effect reduction in crystallinity of the fluoride catalyst, and consequently, to produce a catalyst having enhanced activity. The process can be applied before or after utilization of the catalyst in order to improve its activity incompletely developed during preparation or impaired by use. In the case of used or spent fluoride catalysts, the process further effects removal of carbonaceous deposits and other foreign materials which destroy catalytic activity. Although the process possesses more pronounced advantages with respect to catalysts exhibiting crystallinity, it also serves to beneficiate non-crystalline or "amorphous" fluoride catalysts.

Treatment may be effected at any temperature consistent with development or retention of the desired "crystallite" structure of the particular fluoride catalyst, and, if carbonaceous or other foreign materials are present, with destruction of such materials in the presence of the chlorine trifluoride. The temperature employed in any particular operation depends largely on the source of the catalyst starting material, the reaction in which the catalyst is to be employed and the particular design (e. g. reactor diameter and length) of the equipment for carrying out said reaction. Although lower temperatures may be used, the catalyst treatment is generally effected at about 100° C. or above in order to attain a satisfactory rate of regeneration or activation. Although treatment temperatures as high as 600° C. may be employed, temperatures above about 400° C. should not be employed for too prolonged periods of time, since at the higher temperatures the rate of crystal development is sufficiently high to become a substantial factor tending to counteract the effect of the chlorine trifluoride in favoring development and/or maintenance of "crystallite" structure. Hence, it is desirable to effect the catalyst treatment at temperatures not above about 400° C. and at least about 100° C. in order to realize to maximum extent the beneficiating effect of the chlorine trifluoride in the absence of any counteracting tendency of elevated temperature to promote undesirable crystal growth. Since the productive operations in which the catalysts are employed are often advantageously carried out at temperatures in that range, beneficiation and productive use of the catalysts may follow one another without substantial change in operating temperatures. Particular advantageous treatment temperatures to attain suitable rate of regeneration or activation and to develop or maintain the desired "crystallite" form, reside in the range of about 275° to 325° C.

The optimum treatment time may vary greatly depending primarily upon the particular catalyst material at hand and the treatment temperature. Generally, such time will be relatively short; and usually about 15 to 45 minutes is adequate. Although longer periods of treatment may be used, no beneficial purpose is served thereby, and indeed, at operating temperatures in excess of about 400° C., may have a detrimental effect upon the catalyst. The end point of treatment may be determined by sample test or by experience. By virtue of the relatively rapid regeneration or activation process of the present invention, shutdown time is greatly minimized.

The gas used to sweep the chlorine trifluoride-treated catalyst can be any suitable inert gas. Although nitrogen has been found to be particularly suitable, other inert gases such as $CO_2$ and helium may also be used.

We have also found with respect to the catalyst regeneration feature of our process that it is often desirable to dilute the chlorine trifluoride treating gas with an inert gas such as nitrogen. Such dilution serves to dissipate the heat of reaction caused by the carbonaceous deposits and other foreign materials present in the spent catalyst.

The following examples illustrate the practice of the invention.

Example 1.—An "amorphous" zirconium fluoride catalyst was prepared by gassing zirconium chloride of 4 to 12 mesh in a dry reactor with HF to bring about the conversion of the zirconium chloride to zirconium fluoride, sweeping the catalyst with $N_2$, and then contacting the catalyst with $O_2$ for ½ hour at 450°–480° C.

A sample of the above catalyst which became spent during use in previous fluorination operations was shown to be of low activity for the preparation of $CClF_2CClF_2$ by reaction of $CCl_3CClF_2$ with HF. A sample of the spent catalyst upon examination by X-ray diffraction exhibited extensive crystallinity, as well as diffraction patterns, due to the presence of foreign compounds. A 155 cc. portion of the catalyst was contacted with chlorine trifluoride at a temperature of about 300° C. for about 30 minutes. After sweeping the catalyst with nitrogen, the activity of the catalyst was tested for the fluorination of $CCl_3CClF_2$ to $CClF_2CCl_2F$. The following results were obtained.

| HF (mols/hour) | $CCl_3CClF_2$ (mols/hour) | Percent Conversion | Temperature, ° C. |
|---|---|---|---|
| 0.48 | 1.06 | 77 | 300 |
| 0.53 | 1.00 | 71 | 332 |
| 0.52 | 0.96 | 74 | 406 |
| 0.51 | 0.86 | 74.5 | 356 |

A fresh zirconium fluoride catalyst prepared as described above generally gives about 80–85% conversion at 300° C. Therefore, by the above regeneration procedure spent catalyst may be restored to efficiency up to about 96.3% of that of the fresh catalyst. X-ray diffraction patterns of the regenerated catalyst indicated about 25% reduction in crystallinity as well as substantial removal of foreign materials.

Example 2.—A batch of fresh zirconium fluoride catalyst was prepared in the following manner. Powdered anhydrous zirconium chloride was placed in a dry reactor under an atmosphere of nitrogen, and was gassed with HF and $N_2$ at a temperature not exceeding 130° C. When almost complete conversion to zirconium fluoride was obtained, the temperature was raised to 205° C. Gassing was continued during the period of rising temperature and for 1 hour after the temperature of 205° C. had been reached. The catalyst was then swept with nitrogen. The zirconium fluoride in powdered form was compressed at 10,000 pounds per square inch, and the resulting cake was broken up to mesh size of 4 to 14. When analyzed by X-ray diffraction, the catalyst showed some crystallinity.

The above catalyst after being subjected to temperature of about 400° C. for an hour to develop its activity gave the following results in the preparation of $CClF_2CCl_2F$ by reaction of $CCl_3CClF_2$ with HF.

| HF (mols/hour) | $CCl_3CClF_2$ (mols/hour) | Temperature, ° C. | Percent Conversion |
|---|---|---|---|
| 0.58 | 1.01 | 300 | 76.3 |

When the treatment at 400° C. was omitted, the activity of the catalyst was substantially lower for the reaction indicated.

A batch of the same catalyst was contacted with chlorine trifluoride at about 300° C. for about 30 minutes. Without the prior induction period at higher temperature, it was used in the fluorination of $CCl_3CClF_2$ to $CClF_2CCl_2F$ by means of HF. The following results were obtained.

| Hours on Stream | HF (mols/hour) | $CCl_3CClF_2$ (mols/hour) | Temperature, ° C. | Percent Conversion |
|---|---|---|---|---|
| ½–1½ | 0.48 | 1.05 | 330 | 82.5 |
| 1½–2½ | 0.52 | 0.99 | 307 | 82.7 |

Thus, in the case of pre-treatment of fresh catalyst with chlorine trifluoride, no preheat at above reaction temperature was required, and improved catalyst efficiency was realized. X-ray patterns of the fresh catalyst showed reduction of crystallinity by the chlorine trifluoride treatment.

Similar data were obtained for fresh zirconium fluoride catalyst which showed virtually an amorphous X-ray pattern. In this case again, while a break-in period was required at 400° C. to complete activation for the fresh catalyst, contacting the catalyst with chlorine trifluoride at 300° C. for about 30 minutes gave good fluorination activity at the start at 300° C.

When the above procedures for the regeneration of spent zirconium fluoride catalyst and for the activation of fresh zirconium fluoride catalyst are used for the regeneration and activation of aluminum fluoride catalysts, similar beneficial results are obtained.

The process of the present invention is suitable for zirconium and aluminum fluoride catalysts before or after use in reactions for altering the halogen content of organic carbon compounds containing halogen, other than those reactions described in the above examples. Another typical reaction for use of zirconium fluoride catalysts is: fluorination of $CCl_4$ to $CCl_2F_2$. Other typical reactions for use of aluminum fluoride catalysts are: fluorination of $CCl_4$ to $CCl_2F_2$, fluorination of $C_2Cl_4$ to $C_2F_4Cl_2$ and $C_2ClF_5$, disproportionation of $CH_3CClF_2$ to $CH_3CF_3$ and dehydrofluorination of $CH_3CHF_2$ to $CH_2=CHF$.

Since various changes and modifications may be made without departing from the spirit thereof, the invention is to be taken as limited only by the scope of the appended claims.

We claim:

1. A process for beneficiating a catalyst of the group consisting of aluminum fluoride and zirconium fluoride which comprises contacting said catalyst with chlorine trifluoride at temperature not above about 600° C. for a time sufficient to effect beneficiation.

2. A process for beneficiating a catalyst of the group consisting of aluminum fluoride and zirconium fluoride which comprises contacting said catalyst with chlorine trifluoride at temperature of about 100° to 400° C. for a time sufficient to effect beneficiation.

3. The process of claim 2 in which the catalyst is in fresh form.

4. The process of claim 2 in which the catalyst is in spent form contaminated with foreign materials.

5. A process for regenerating a spent zirconium fluoride catalyst contaminated with foreign materials which comprises contacting said catalyst with chlorine trifluoride at temperature of about 275° to 325° C. for about 15 to 45 minutes, and then sweeping the catalyst with an inert gas.

6. A process for activating a fresh zirconium fluoride catalyst which comprises contacting said catalyst with chlorine trifluoride at temperature of about 275° to 325° C. for about 15 to 45 minutes, and then sweeping the catalyst with an inert gas.

References Cited in the file of this patent

UNITED STATES PATENTS

| | | |
|---|---|---|
| 2,336,165 | Connolly | Dec. 7, 1943 |
| 2,415,716 | Veltman | Feb. 11, 1947 |
| 2,430,735 | Ray et al. | Nov. 11, 1947 |
| 2,568,964 | Montgomery et al. | Sept. 25, 1951 |